US012755450B2

(12) United States Patent
Lin et al.

(10) Patent No.: US 12,755,450 B2

(45) Date of Patent: Oct. 6, 2026

(54) SYSTEMS AND METHODS FOR GENERATING CREATIVE SKETCHES USING MODELS GUIDED BY SKETCHES AND TEXT

(71) Applicant: Toyota Research Institute, Inc., Los Altos, CA (US)

(72) Inventors: Chuan-En Lin, Pittsburgh, PA (US); Hyeonsu B. Kang, Pittsburgh, PA (US); Nikolas A. Martelaro, Pittsburgh, PA (US); Aniket D. Kittur, Pittsburgh, PA (US); Yin-Ying Chen, San Jose, CA (US); Matthew K. Hong, Mountain View, CA (US)

(73) Assignees: Toyota Research Institute, Inc., Los Altos, CA (US); Toyota Jidosha Kabushiki Kaisha, Toyota (JP); Carnegie Mellon University, Pittsburgh, PA (US)

( * ) Notice: Subject to any disclaimer, the term of this patent is extended or adjusted under 35 U.S.C. 154(b) by 39 days.

(21) Appl. No.: 18/640,519

(22) Filed: Apr. 19, 2024

(65) Prior Publication Data

US 2025/0265744 A1 Aug. 21, 2025

Related U.S. Application Data

(60) Provisional application No. 63/556,088, filed on Feb. 21, 2024.

(51) Int. Cl.

*G06T 11/23* (2026.01)

*G06T 7/12* (2017.01)

(Continued)

(52) U.S. Cl.

CPC ................ *G06T 11/23* (2026.01); *G06T 7/12* (2017.01); *G06T 7/13* (2017.01); *G06T 7/50* (2017.01);

(Continued)

(58) Field of Classification Search

CPC . G06T 11/203; G06T 7/12; G06T 7/13; G06T 7/50; G06T 11/60; G06T 15/506;

(Continued)

(56) References Cited

U.S. PATENT DOCUMENTS

| | | | | |
|---|---|---|---|---|
| 10,387,730 | B1 | 8/2019 | Cowburn et al. | |
| 2017/0109929 | A1 * | 4/2017 | Meier | G06T 7/74 |

(Continued)

FOREIGN PATENT DOCUMENTS

| | | | |
|---|---|---|---|
| AU | 2021100391 | A4 | 4/2021 |
| CN | 114373077 | A | 4/2022 |

(Continued)

OTHER PUBLICATIONS

Ploennigs et al., "AI Art in Architecture," AI Civ. Eng. 2, article No. 8, Aug. 17, 2023, pp. 1-21.

(Continued)

*Primary Examiner* — Michael Le

(74) *Attorney, Agent, or Firm* — Christopher G. Darrow; Darrow Mustafa, PC

(57) ABSTRACT

Systems, methods, and other embodiments described herein relate to generating images and sketches iteratively using models guided by sketches and text for a design. In one embodiment, a method includes generating an image from a sketched stroke and text inputted to a learning model. The method also includes segmenting the image to identify boundary information with a segmentation model and extracting edge information from the image using an edge model. The method also includes rendering an estimated (Continued)

sketch of the image by computing an intersection between the boundary information and the edge information.

20 Claims, 5 Drawing Sheets

(51) Int. Cl.
*G06T 7/13* (2017.01)
*G06T 7/50* (2017.01)
*G06T 11/60* (2026.01)
*G06T 15/50* (2011.01)
*G06T 15/60* (2006.01)

(52) U.S. Cl.
CPC ............ *G06T 11/60* (2013.01); *G06T 15/506* (2013.01); *G06T 15/60* (2013.01); *G06T 2207/10024* (2013.01); *G06T 2210/21* (2013.01); *G06T 2210/62* (2013.01)

(58) Field of Classification Search
CPC ........... G06T 15/60; G06T 2207/10024; G06T 2210/21; G06T 2210/62; G06T 17/00; G06T 19/00; G06T 19/20
See application file for complete search history.

(56) References Cited

U.S. PATENT DOCUMENTS

| | | | | |
|---|---|---|---|---|
| 2020/0334793 | A1* | 10/2020 | Chen | G06T 7/194 |
| 2021/0097323 | A1 | 4/2021 | Wei et al. | |
| 2022/0226734 | A1 | 7/2022 | Pedersen et al. | |
| 2022/0237368 | A1 | 7/2022 | Tran | |
| 2023/0068103 | A1 | 3/2023 | Zhou et al. | |
| 2023/0186569 | A1* | 6/2023 | Willkie | G06T 7/12 345/633 |
| 2024/0203138 | A1* | 6/2024 | Phalak | G06F 18/2431 |
| 2024/0249318 | A1* | 7/2024 | Spiegel | G06Q 30/0269 |
| 2025/0078229 | A1* | 3/2025 | Zhang | G06T 7/40 |
| 2025/0086865 | A1* | 3/2025 | Menges | G06T 11/10 |
| 2025/0117126 | A1* | 4/2025 | Kale | G06F 3/04845 |
| 2025/0117990 | A1* | 4/2025 | Harpavat | G06F 3/04845 |
| 2025/0157126 | A1* | 5/2025 | Zhang | G06T 15/06 |
| 2025/0191262 | A1 | 6/2025 | Bhakthavatsalam et al. | |

FOREIGN PATENT DOCUMENTS

| | | | | | |
|---|---|---|---|---|---|
| CN | 115082549 | A | | 9/2022 | |
| CN | 116612280 | A | * | 8/2023 | G06V 10/26 |
| CN | 116645510 | A | | 8/2023 | |
| CN | 117456055 | A | | 1/2024 | |
| CN | 117475035 | A | | 1/2024 | |
| JP | 2011137908 | A | | 7/2011 | |

OTHER PUBLICATIONS

Zhang et al., "ControlNet," 2023, 37 pages, found at https://github.com/Illyasviel/ControlNet.

Unknown, "OpenAI GPT," 12 pages, last accessed on Dec. 18, 2023, found at https://platform.openai.com/docs/guides/text-generation/json-mode.

Sikelianos et al., "ScribbleDiffusion," 2 pages, last accessed on Dec. 18, 2023, found at https://github.com/replicate/scribble-diffusion.

Xie et al., "Holistically-Nested Edge Detection," arXiv:1504.06375v2, Oct. 4, 2015, pp. 1-10.

Baltes et al., "Round-Trip Sketches: Supporting the Lifecycle of Software Development Sketches from Analog to Digital and Back," IEEE Working Conference on Software Visualization (VISSOFT), Shanghai, China, 2017, pp. 94-98.

Ji et al., "DDP: Diffusion Model for Dense Visual Prediction," arXiv:2303.17559v2, May 13, 2023. pp. 1-19.

Yang et al., "Idea2Img: Iterative Self-Refinement with GPT-4V(ision) for Automatic Image Design and Generation," arXiv:2310.08541v1, Oct. 12, 2023, pp. 1-17.

Feng et al., "CCEdit: Creative and Controllable Video Editing via Diffusion Models," arXiv:2309.16496v2, Dec. 1, 2023, pp. 1-22.

Zhang et al., "Text2NeRF: Text-Driven 3D Scene Generation with Neural Radiance Fields," in IEEE Transactions on Visualization and Computer Graphics, Jan. 31, 2024, pp. 1-14.

Zhou et al., "Improving Cross-modal Alignment for Text-Guided Image Inpainting," arXiv:2301.11362, Jan. 26, 2023, pp. 1-12.

Wikimedia Foundation. Naked Mole-rat. Wikipedia. https://en.wikipedia.org/wiki/Naked_mole-rat Accessed Nov. 27, 2023. 15 pages.

Baek et al. "Knowledge-Augmented Language Model Prompting for Zero-Shot Knowledge Graph Question Answering." arXiv preprint arXiv:2306.04136 (2023). 29 pages.

Janine Benyus "Biomimicry: Innovation inspired by nature". New York: Morrow, 1997.

Broeckhoven et al. "Escaping the labyrinth of bioinspiration: biodiversity as key to successful product innovation." Advanced Functional Materials, vol. 32, issue 18 (2022): 2110235, Abstract only, 1 page.

Banki et al. "Catalogue of Life Checklist". Checklistbank. https://doi.org/10.48580/ddz4x Accessed Nov. 27, 2023: 33 pages.

Chung et al. "Increasing Diversity While Maintaining Accuracy: Text Data Generation with Large Language Models and Human Interventions." arXiv preprint arXiv:2306.04140 (2023). 17 pages.

Dohan et al. "Language model cascades." arXiv preprint arXiv:2207.10342 (2022). 13 pages.

Parr et al. "The Encyclopedia of Life" v2: Providing Global Access to Knowledge About Life on Earth. Biodiversity Data Journal 2: e1079, doi: 10.3897/BDJ.2.e1079. Available from http://eol.org. Accessed Nov. 27, 2023: 2 pages.

Dedre Gentner "Structure-mapping: A theoretical framework for analogy." Cognitive science 7.2 (1983): 155-170. 16 Pages.

Dedre Gentner "Analogy in Scientific Discovery: The Case of Johannes Kepler" Model-Based Reasoning: Science, Technology, Values (2002): 19 pages.

Gentner et al. "Analogy and creativity in the works of Johannes Kepler." Creative thought: An investigation of conceptual structures and processes. Washington DC: American Psychological Association (1997). 29 pages.

Gentner et al. "Analogical reminding: A good match is hard to find." In Proceedings of the International Conference on Systems, Man and Cybernetics. Tucson Arizona (1985) 15 pages.

Gick et al. "Analogical problem solving." Cognitive psychology vol. 12 (1980): 50 pages.

Gilon et al. "Analogy mining for specific design needs." Proceedings of the 2018 CHI Conference on Human Factors in Computing Systems. 2018.11 pages.

Gu et al. "Mechanical properties and application analysis of spider silk bionic material." e-Polymers vol. 20, No. 1 (2020): 15 pages.

Johnson et al. "Billion-scale similarity search with gpus." IEEE Transactions on Big Data vol. 7, No. 3 (2019): 535-547. 12 pages.

Kang et al. "Augmenting Scientific Creativity with Retrieval across Knowledge Domains." arXiv preprint arXiv:2206.01328 (2022). 11 pages.

Mora et al. "How many species are there on Earth and in the ocean ?. " PLoS biology vol. 9 Issue 8 (2011): e1001127. 8 pages.

Norman et al. "User Centered System Design: New perspectives on human-computer interaction," J. Educational Computing Research, vol. 3, issue 1, 1987, pp. 129-134.

Robert Oppenheimer, "Analogy in science." American Psychologist vol. 11 Issue 3 (1956): 127-135.

Rees et al. "All genera of the world: an overview and estimates based on the Mar. 2020 release of the Interim Register of Marine and Nonmarine Genera (IRMNG)." Megataxa 1.2 (2020): 18 pages.

Brian H. Ross "This is like that: The use of earlier problems and the separation of similarity effects." Journal of Experimental Psychology: Learning, Memory, and Cognition vol. 13 Issue 4 (1987): Abstract only.

Shu et al. "Biologically inspired design." CIRP annal Manufacturing Technology vol. 60 Issue 2 (2011): 22 pages.

(56) References Cited

OTHER PUBLICATIONS

L. Sweetlove "Number of species on Earth tagged at 8.7 million." Nature (2011), 1 page, found at https://doi.org/10.1038/news.2011.498.
Vandevenne et al. "Enhancing novelty with knowledge-based support for Biologically-Inspired Design." Design Studies 46 (2016): 26 pages.
Vattam et al. "Seeking bioinspiration online: a descriptive account." DS 75-7: Proceedings of the 19th International Conference on Engineering Design (ICED13), Design for Harmonies, vol. 7: Human Behaviour in Design, Seoul, Korea, Aug. 19-22, 2013. (2013). 10 pages.
Vattam et al. "Foraging for inspiration: understanding and supporting the online information seeking practices of biologically inspired designers." International Design Engineering Technical Conferences and Computers and Information in Engineering Conference. vol. 54860. (2011). Abstract Only.
Wikimedia Foundation. "Genus." Wikipedia. https://en.wikipedia.org/wiki/Genus##cite_note-10. Accessed Nov. 30, 2023: 8 pages.
Yu et al. "Distributed analogical idea generation with multiple constraints." Proceedings of the 19th ACM conference on computer-supported cooperative work & social computing. (2016). 10 pages.
Monika Zagrobelna, "How to Learn to Draw by Tracing," Aug. 16, 2020, 29 pages, found at https://monikazagrobelna.com/2020/08/16/how-to-learn-to-draw-bytracing/.
Betker et al., "Improving image generation with better captions," Computer Science, 2023, pp. 1-19.
Brown et al., "Language models are few-shot learners," Advances in neural information processing systems, NeurIPS 2020, pp. 1877-1901.
John Canny, "A computational approach to edge detection," IEEE Transactions on pattern analysis and machine intelligence 6, 1986, pp. 679-698.
Caneel K. Joyce, "The blank page: Effects of constraint on creativity," University of California, Berkeley, 2009, 132 pages.
Kirillov et al., "Segment anything," arXiv:2304.02643, Apr. 5, 2023, pp. 1-30.
Lewis et al., "Retrieval-augmented generation for knowledge-intensive NLP tasks," Advances in Neural Information Processing Systems 33, 2020, pp. 9459-9474.
Liu et al., "Zero-1-to-3: Zero-shot one image to 3d object," In Proceedings of the IEEE/CVF International Conference on Computer Vision, 2023, pp. 9298-9309.
Podell et al., "Sdxl: Improving latent diffusion models for high-resolution image synthesis," arXiv:2307.01952, Jul. 4, 2023, pp. 1-21.
Qin et al., "U2-Net: Going deeper with nested U-structure for salient object detection," Pattern recognition vol. 106, Mar. 8, 2022, pp. 1-15.
Ranftl et al., "Towards robust monocular depth estimation: Mixing datasets for zero-shot cross-dataset transfer," IEEE transactions on pattern analysis and machine intelligence, vol. 44, No. 3, 2020, pp. 1623-1637.
Rombach et al., "High-resolution image synthesis with latent diffusion models," In Proceedings of the IEEE/CVF conference on computer vision and pattern recognition, pp. 10684-10695.
Wei et al., "Chain-of-thought prompting elicits reasoning in large language models," Advances in Neural Information Processing Systems 35, 2022, pp. 24824-24837.
Xie et al., "Holistically-nested edge detection," In Proceedings of the IEEE international conference on computer vision, 2015, pp. 1395-1403.
Zhang et al., "Adding Conditional Control to Text-to-Image Diffusion Models," Proceedings of the IEEE/CVF International Conference on Computer Vision (ICCV), 2023, pp. 3836-3847.
Li et al., "Photo-Sketching: Inferring Contour Drawings from Images" IEEE Winter Conference on Applications of Computer Vision (WACV), Waikoloa, HI, USA, 2019, pp. 1403-1412.
Jiang et al., "SFSegNet: Parse Freehand Sketches using Deep Fully Convolutional Networks," International Joint Conference on Neural Networks (IJCNN), Budapest, Hungary, 2019, pp. 1-8.
Zheng et al., "Deep Semantic Parsing of Freehand Sketches with Homogeneous Transformation, Soft-Weighted Loss, and Staged Learning," in IEEE Transactions on Multimedia, vol. 23, pp. 3590-3602.
Wu et al., "DeepPortraitDrawing: Generating Human Body Images from Freehand Sketches," Computers & Graphics, vol. 116, Nov. 2023, pp. 73-81.
Xu et al., "On Learning Semantic Representations for Million-Scale Free-Hand Sketches," arXiv:2007.04101, Jul. 7, 2020, pp. 1-13.
Yang et al., "SketchGNN: Semantic Sketch Segmentation with Graph Neural Networks," ACM Transactions on Graphics, vol. 40, No. 3, article No. 28, Mar. 25, 2021, pp. 1-13.
Para et al., "SketchGen: Generating Constrained CAD Sketches," arXiv:2106.02711, Jun. 4, 2021, pp. 1-21.
Liu et al., "Self-Supervised Sketch-to-Image Synthesis," Proceedings of the AAAI Conference on Artificial Intelligence, vol. 35, No. 3, May 18, 2021, pp. 2073-2081.
Unknown, "OpenAI Generative Pre-trained Transformer (GPT) for generating an image as a design inspiration using text," last accessed Feb. 26, 2024, 11 pages, found at https://platform.openai.com/docs/guides/text-generation/chat-completions-api.
Sikelianos et al., "Scribble-Diffusion," last accessed Feb. 26, 2024, 3 pages, found at https://github.com/replicate/scribble-diffusion.
Shahbazi et al., "InseRF: Text-Driven Generative Object Insertion in Neural 3D Scenes," arXiv:2401.05335, Jan. 10, 2024, pp. 1-16.
Manukyan et al., "HD-Painter: High-Resolution and Prompt-Faithful Text-Guided Image Inpainting with Diffusion Models," arXiv:2312.14091, pp. 1-29.
Perche-Mahlow et al., "An Inpainting-Infused Pipeline for Attire and Background Replacement," arXiv:2402.03501, Feb. 5, 2024, pp. 1-10.
Kaimoto et al., "Sketched Reality: Sketching Bi-Directional Interactions Between Virtual and Physical Worlds with AR and Actuated Tangible UI," Proceedings of the 35th Annual ACM Symposium on User Interface Software and Technology, article No. 1, Oct. 4, 2022, pp. 1-12.

* cited by examiner

SYSTEMS AND METHODS FOR GENERATING CREATIVE SKETCHES USING MODELS GUIDED BY SKETCHES AND TEXT

CROSS-REFERENCE TO RELATED APPLICATIONS

This application claims the benefit of U.S. Provisional Application No. 63/556,088, filed on Feb. 21, 2024, which is herein incorporated by reference in its entirety.

TECHNICAL FIELD

The subject matter described herein relates, in general, to generating images using sketches, and, more particularly, to generating images and sketches iteratively using models guided by sketches and text.

BACKGROUND

Systems for designing creative objects and products can use software tools having design engines that shorten development cycles. Designers can manipulate sketches through the design engines and collaborate with multi-discipline teams (e.g., sales) with the software tools. Nevertheless, the software tools still demand that designers perform arduous tasks during development, such as color selection, image searching, and contouring. As such, the benefit to design cycles has limits with the software tools, particularly involving complex products (e.g., vehicles) having multiple facets and parts.

In various implementations, systems use a text-to-image (T2I) model that is trained to synthesize images using text for design. For example, a T2I model generates shapes for a part that completes a vehicle guided with textual inputs. Notwithstanding, these systems encounter difficulties generating images that include detailed features described with text and inputted design parameters. As such, the designer may manually alter and manipulate generated designs according to the design parameters. The alteration increases design iterations and time, thereby reducing the efficiency benefits of the T2I model. Therefore, systems designing objects using models with text can lack details and limit design creativity.

SUMMARY

In one embodiment, example systems and methods relate to generating images and sketches iteratively using models guided by sketches and text for a design. In various implementations, systems implementing a text-to-image (T2I) model accelerate design cycles through converting textual ideas into visuals. As such, designers rely on T2I models to support and enhance creative tasks. Still, designers encounter difficulties with completing creative tasks despite advanced capabilities of the T2I model. For example, generating a vehicle part with T2I frustrates designers when the T2I poorly tracks a specific theme and outputs haphazard renders having a vehicle incorporating the vehicle part. Therefore, systems running a design engine with T2I can lack creativity and face limitations for generating images efficiently that meet design goals.

Therefore, in one embodiment, a drawing system inspires unique designs from various domains while reducing development through iterative sketching using models that are guided by sketches and text. In particular, the drawing system renders an estimated sketch of an image generated by a learning model as feedback for further enhancing design ideas. In one approach, the drawing system computes the estimated sketch through identifying an intersection between boundary information and edge information outputted by a data-driven model and an edge model, respectively. Furthermore, the drawing system also controls design over the ideation generation and concept exploration through modifying the estimated sketches and inputting additional text to guide the learning model. Accordingly, the drawing system produces design ideas from nature, architecture, fashion, etc., related to a product specified with text and a sketch as inputs and the estimated sketch.

In one embodiment, a drawing system for generating images and sketches iteratively using models guided by sketches and text for a design is disclosed. The drawing system includes a memory including instructions that, when executed by a processor, cause the processor to generate an image from a sketched stroke and text inputted to a learning model. The instructions also include instructions to segment the image to identify boundary information with a segmentation model and extract edge information from the image using an edge model. The instructions also include instructions to render an estimated sketch of the image by computing an intersection between the boundary information and the edge information.

In one embodiment, a non-transitory computer-readable medium for generating images and sketches iteratively using models guided by sketches and text for a design and including instructions that when executed by a processor cause the processor to perform one or more functions is disclosed. The instructions include instructions to generate an image from a sketched stroke and text inputted to a learning model. The instructions also include instructions to segment the image to identify boundary information with a segmentation model and extract edge information from the image using an edge model. The instructions also include instructions to render an estimated sketch of the image by computing an intersection between the boundary information and the edge information.

In one embodiment, a method for generating images and sketches iteratively using models guided by sketches and text for a design is disclosed. In one embodiment, the method includes generating an image from a sketched stroke and text inputted to a learning model. The method also includes segmenting the image to identify boundary information with a segmentation model and extracting edge information from the image using an edge model. The method also includes rendering an estimated sketch of the image by computing an intersection between the boundary information and the edge information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
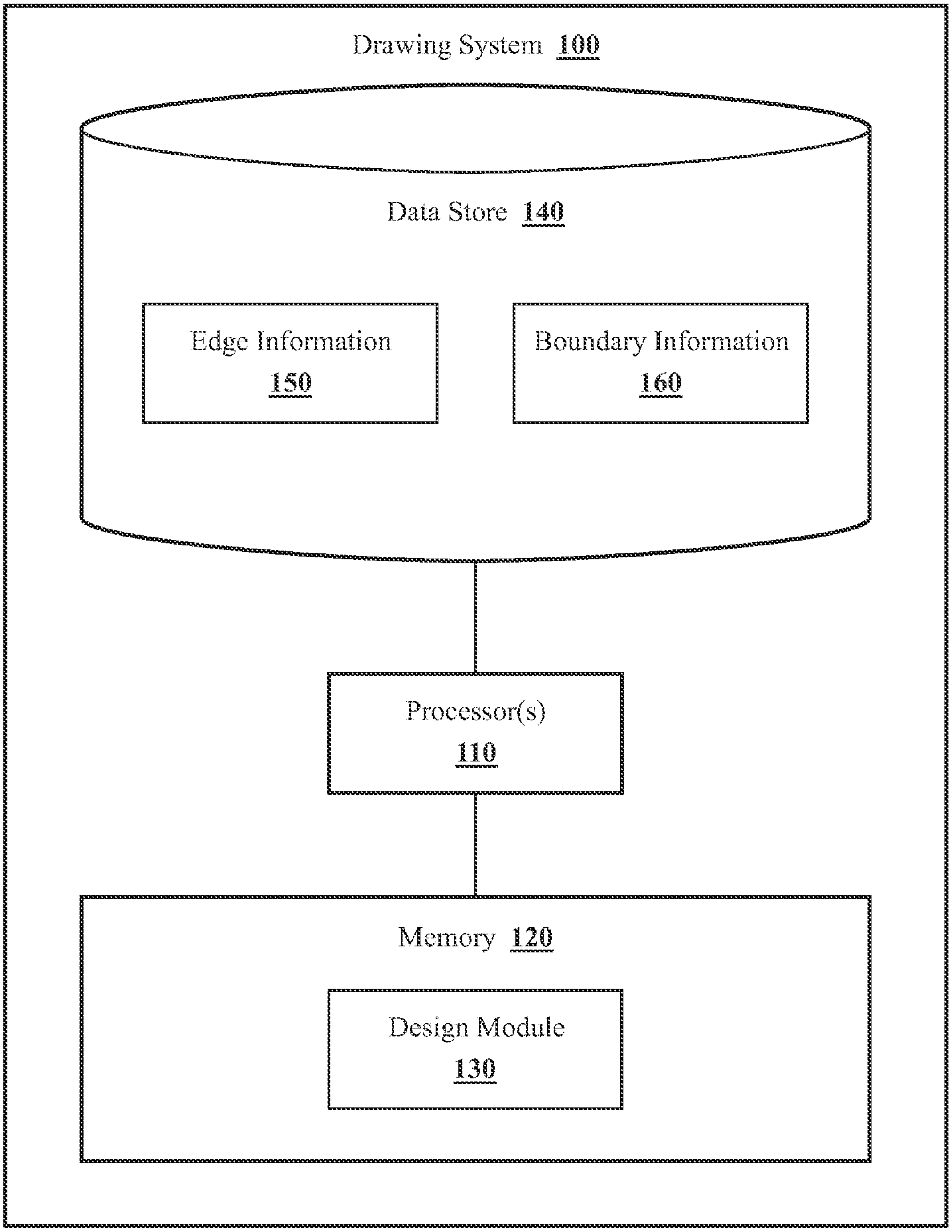
FIG. 1 illustrates one embodiment of a drawing system that generates images and sketches iteratively using models for design ideation including a feedback loop.

Systems, methods, and other embodiments associated with generating images and sketches iteratively using models guided by sketches and text for a design are disclosed herein. In various implementations, a drawing tool that generates ideas with a text-to-image (T2I) model encounters difficulties with interpreting abstract themes. For example, the drawing tool generates a tank for the input "a protected vehicle" as the abstract theme, thereby producing unsatisfactory outcomes. Furthermore, drawing tools can lack effective feedback features for design iteration. As such, the drawing tool having the T2I model exhibits an experience that is one-way and random.

Therefore, in one embodiment, a drawing system generates product designs through sketching and text with a feedback loop that improves iterative ideation. In particular, the feedback loop includes a model that transforms an image generated by a T2I model (e.g., a large language model (LLM)) and a generative model into a sketch that is modifiable. In this way, the drawing system allows continuous iterations that enhance and improve generative designs. In one approach, the drawing system segments an image generated by a learning model using text and a sketched stroke and identifies boundary information. Through segmentation, the drawing system can generate natural borders about the image using a segmentation map that highlights key areas for rendering a high-definition sketch. Furthermore, an edge model extracts edge information from the image for locating key areas within a generative image. Subsequently, the drawing system renders an estimated sketch of the image by computing an intersection between the boundary information and the edge information. In this way, the natural borders of the image are emphasized through removing texture and redundant lines with the intersection representing areas within the image having similar visual data. Accordingly, the drawing system improves rapid design development by generating images iteratively using models guided by sketches and text and a feedback loop rendering realistic sketches of generative images.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 illustrates one embodiment of a drawing system 100 that generates images and sketches iteratively using machine learning (ML) models for design ideation including a feedback loop. The drawing system 100 is shown as including a processor(s) 110 that the drawing system 100 may access through a data bus or another communication path. In one embodiment, the drawing system 100 includes a memory 120 that stores a design module 130. The memory 120 is a random-access memory (RAM), a read-only memory (ROM), a hard-disk drive, a flash memory, or other suitable memory for storing the design module 130. The design module 130 is, for example, computer-readable instructions that when executed by the processor(s) 110 cause the processor(s) 110 to perform the various functions disclosed herein.

Moreover, in one embodiment, the drawing system 100 includes a data store 140. In one embodiment, the data store 140 is a database. The database is, in one embodiment, an electronic data structure stored in the memory 120 or another data store and that is configured with routines that can be executed by the processor(s) 110 for analyzing stored data, providing stored data, organizing stored data, and so on. Thus, in one embodiment, the data store 140 stores data used by the design module 130 in executing various functions. In one embodiment, the data store 140 further includes the edge information 150 and the boundary information 160. The edge information 150 can include soft edges detected using an edge model about an image generated outputted by learning models. Here, a soft edge can include structural lines having varying thicknesses, opacities, and transparency levels. Furthermore, the drawing system 100 can derive the boundary information 160 by estimating a segmentation map using a segmentation model. As explained below, natural borders for colored parts defined by the segmentation map can be utilized to derive the boundary information 160.

Figure 2:
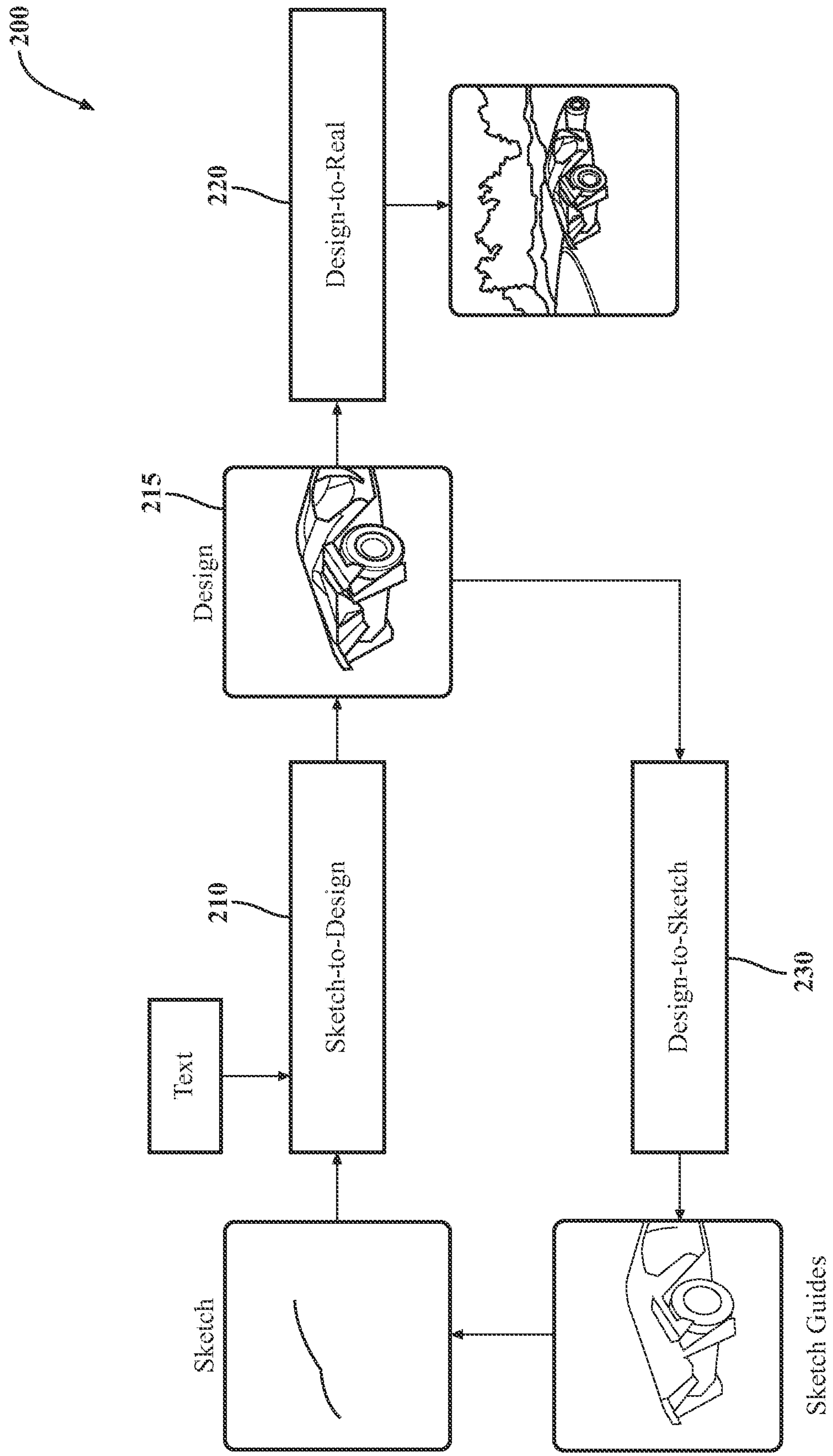
FIG. 2 illustrates one embodiment of a pipeline for the drawing system that generates an image using models that are guided by inputted sketches, estimated sketches, and text.

Moreover, the drawing system 100 as illustrated in FIG. 2 is generally an abstracted form. The drawing system 100 and the design module 130, in one embodiment, also include instructions that cause the processor(s) 110 to generate an image from a sketched stroke and text inputted to a learning model. Here, the learning model may have a pipeline including a LLM and a ML model (e.g., a control network (controlnet)) that generates the image. In one approach, the drawing system 100 segments the image to identify boundary information with a segmentation model (e.g., a data-driven model, a neural network, etc.) and extracts edge information from the image using an edge model. As further explained below, the design module 130 can render an estimated sketch of the image by computing an intersection between the boundary information 160 and the edge information 150.

Now turning to FIG. 2, one embodiment of a pipeline 200 for the drawing system 100 that generates an image using models that are guided by inputted sketches, estimated sketches that are modified, and text is illustrated. The pipeline 200 references one or more models in FIG. 2. A model can include one or more networks, subnetworks, physical models, data-driven models, mathematical models, and so on as understood by those having ordinary skill in the art. In particular, a model sketch-to-design 210 converts a sketched stroke and text inputted about a design concept and generates product designs. For example, a designer inputs a product category (e.g., a vehicle) and a design concept that is abstract (e.g., protective) as the text along with the sketched stroke. A LLM within the sketch-to-design 210 can process the text to generate analogical inspirations for the design concept. An analogical inspiration may encompass a rapid identification of relevant connections from diverse domains (e.g., nature, architecture, fashion, etc.) for inputs. In particular, the text can prompt the LLM to detail a design principle for a subject. For instance, the prompt can be "Describe the key design principles in <subject> design in a brief description." The prompt also may be context for the LLM to generate well-thought-out inspirations.

Given the design principles, the drawing system 100 prompts the LLM to generate inspirations from diverse domains (e.g., nature, art, architecture, fashion, etc.). For instance, the prompt is that you are a <subject> designer and the design principles in <subject> design is from <design principles> associated with initial generative processing. The LLM then ideates inspirations for <subject> design to convey sensible <concept> from domains such as nature, art, architecture, fashion, etc. Furthermore, the drawing system 100 can specify formatting for an answer from the LLM. For example, a format is a bullet-pointed list (e.g., five items). As additional enhancements of the design concept through iterations, a designer may select a design idea recommended and continue branching out to explore further inspirations.

Upon selecting a design idea outputted by the LLM, a ML model within the sketch-to-design 210 receives the sketched stroke. For example, the sketched stroke is a single line captured by a canvas on a user interface. Here, the ML model may be a controlnet that receives the design idea as text and the sketched stroke for rendering a generative image 215, such as with stable diffusion. In various implementations, stable diffusion is a model that includes a variational autoencoder (VAE) for compressing an image from a pixel space to a latent space having reduced dimensionality, thereby capturing improved semantics. The model can iteratively apply Gaussian noise to the compressed latent representation during forward diffusion. Furthermore, a U-Net denoises the output from forward diffusion backwards and derives a latent representation accordingly. The VAE may decode and generate a final image by converting the latent representation back into the pixel space.

Additionally, the drawing system 100 can continue guiding design ideas using additional strokes inputted and modifying sketches estimated with a model design-to-sketch 230. A new design is generated with an additional stroke, thereby making the creation process iterative. The drawing system 100 also focuses on sketching rather than engineering text prompts that improves creativity and reduces development time. In one approach, the drawing system 100 maintains an initial seed between generations for consistency and image generation that is rapid. Here, a seed may be additional text, words, images, image descriptions, etc. that is inputted to the sketch-to-design 210. In another approach, the drawing system 100 receives a remix command that changes to a different seed and the sketch-to-design 210 generates a varied image accordingly. This process can include remixing text to generate varied forms of the image from randomizing seeds associated with design parameters. For example, the design parameters describe through text and numerals one of a body line, an exterior contour, scenery information, a product type, a product feel, a product perception, etc. Subsequently, the design-to-sketch 230 can generate a sketch from a generative image outputted by the sketch-to-design 210 and provide a feedback loop that is interactive and focused.

Figure 3:
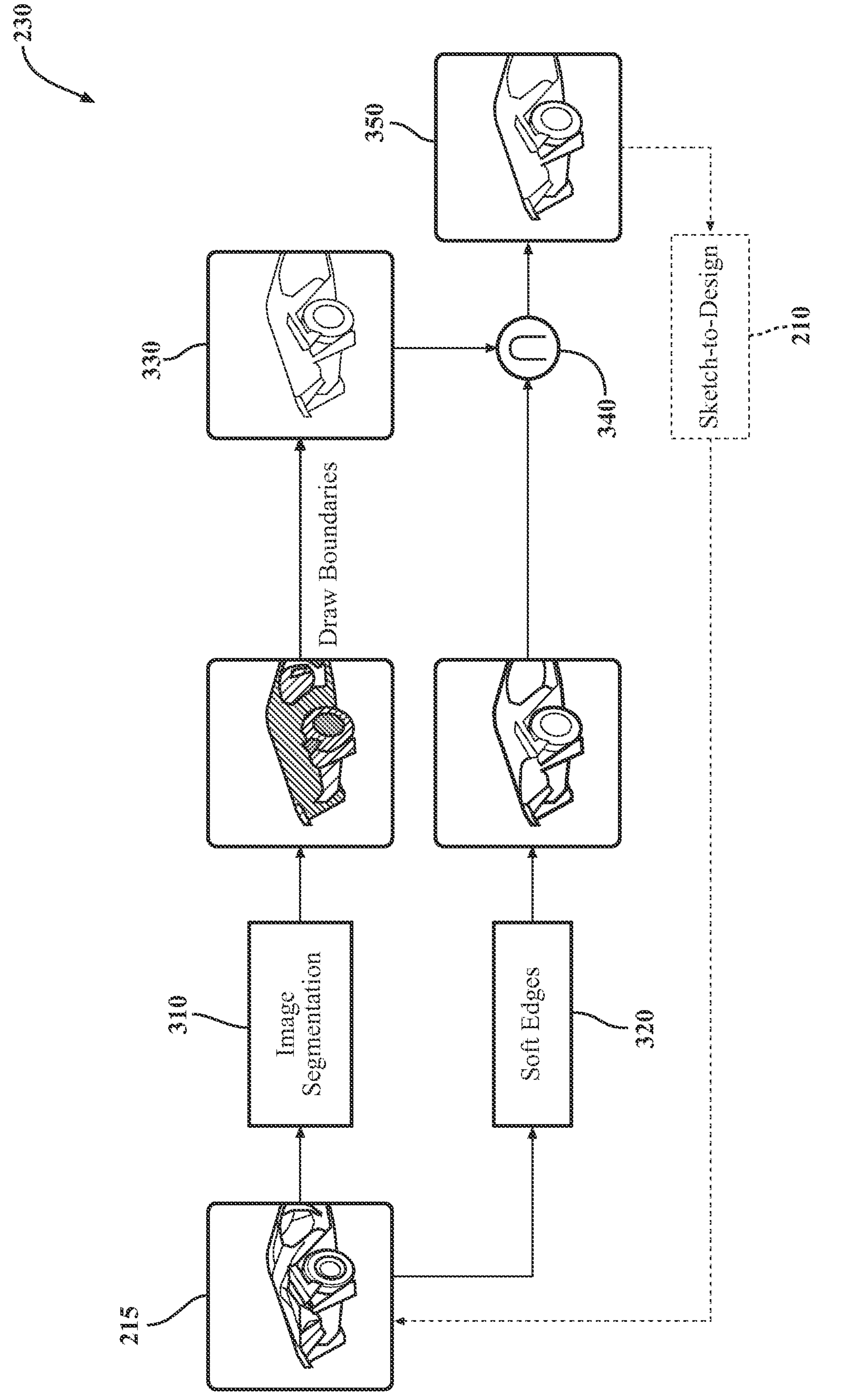
FIG. 3 illustrates one embodiment of the drawing system having a model rendering an estimated sketch from the image generated with a learning model.

FIG. 3 illustrates one embodiment of the drawing system 100 having the design-to-sketch 230 rendering an estimated sketch from an image generated with a learning model. Here, designers and stakeholders can build on generative images by converting designs into sketch-style visuals. This provides a feedback loop for further design enhancements and mitigates limitations associated with textual prompts. An estimated sketch allows designers to visualize an underlay on a canvas like tracing paper. The estimated sketch also encourages inspirations from previously generated images and overcomes the challenge of starting with a blank canvas, especially with early designs. In this way, the drawing system 100 implements iterative sketching for design ideation through a sketch-to-design-to-sketch feedback loop.

Moreover, the design-to-sketch 230 includes a model for image segmentation 310 (e.g., a data-driven model) that executes semantic, instance, etc. segmentation on the generative image 215 outputted from the sketch-to-design 210 and estimates a segmentation map. Correspondingly, the drawing system 100 can identify the boundary information 160 from the segmentation map and form a skeleton drawing 330. For instance, the segmentation map includes natural borders that are separated by defined parts (e.g., silhouettes, colored parts, grey-scale units, etc.) of the generative image 215. The defined parts may be identified according to estimated classifications by the segmentation model for areas within the generative image 215. For example, the image segmentation 310 is trained with annotated data of a vehicle having colored parts differentiating between wheels and doors as semantic classes. Furthermore, the soft edges 320 extract and locate the edge information 150 that includes soft edges from the generative image 215 using an edge model. As previously explained, a soft edge can include structural lines having varying thicknesses, opacities, and transparency levels rather than common edges associated with the generative image 215. In one approach, the edge model is a holistically-nested edge detection (HED) model that detects hard edges, soft edges, etc. from an image using hierarchical representations within a neural network (NN). In this way, the design-to-sketch 230 estimates a high-resolution and realistic sketch 350 using an intersection 340 operation between the edge information 150 and the boundary information 160.

Regarding details about the intersection 340 operation, the design module 130 locates structural lines that dominate and natural borders of the generative image 215, thereby eliminating redundant lines and unwanted texture from the realistic sketch 350. Redundant lines detected by the soft edges 320 and found within the skeleton drawing 330 can reduce the clarity, definition, and reality of sketches. The intersections are areas within the generative image 215 having similar visual data that can increase focus on the structural lines. For example, a main silhouette of a finger within a generated object is thicker than the inner wrinkles. In one approach, the intersection 340 operation removes wrinkles, texture, and redundant patterns by functioning as "AND" computational logic for areas within the generated object having the main silhouette and edges. In this way, the drawing system 100 allows varying thicknesses and line opacity through processing with the soft edges 320 and manipulating the skeleton drawing 330 for creating realistic, natural, and defined aesthetics to the realistic sketch 350.

Following the realistic sketch 350 being modified and refined with the sketch-to-design 210 and the design-to-sketch 230 that improves the generative image 215, the design-to-real 220 generates visuals that demonstrate the generative image 215 within a realistic environment. In one approach, the design-to-real 220 is a pipeline that includes LLM prompting for describing a scene and scale associated with a subject. The design-to-real 220 then estimates depth (e.g., pixel depth) within the generative image 215 after scaling and manipulates the LLM output. In this way, the design-to-real 220 can plant the generative image 215 within a realistic scene that mimics natural lighting and shadows.

Figure 4:
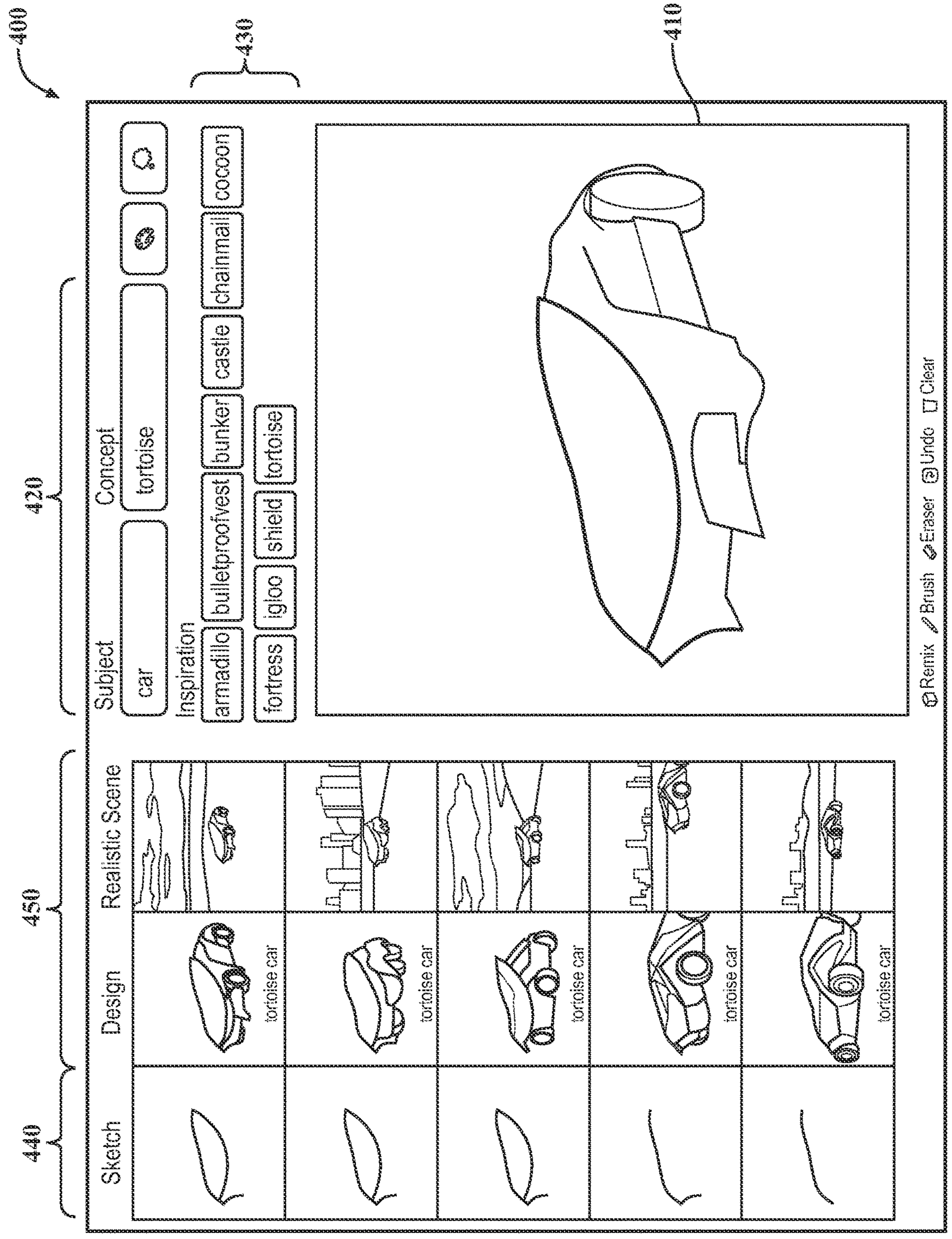
FIG. 4 illustrates an example of a user interface (UI) that can modify the image generated with the learning model rendered as a sketch.

Turning now to FIG. 4, an example of a user interface (UI) 400 that can modify an image generated with a learning model rendered as a sketch is illustrated. Here, the drawing system 100 can underlay an estimated sketch generated by the design-to-sketch 230 within a canvas 410 on the UI 400. The estimated sketch can be rendered from an image generated by the sketch-to-design 210 using subject and concept inputs 420, inspirations 430, and a sketched stroke. A designer can modify the estimated sketch generated by the design-to-sketch 230 within the panel 440. The sketch-to-design 210 processes the estimated sketch as modified to form a feedback loop and outputs the various designs 450 including placing images within realistic scenes. Therefore, ideation and creative design converge more rapidly with the drawing system 100 using the feedback loop.

Figure 5:
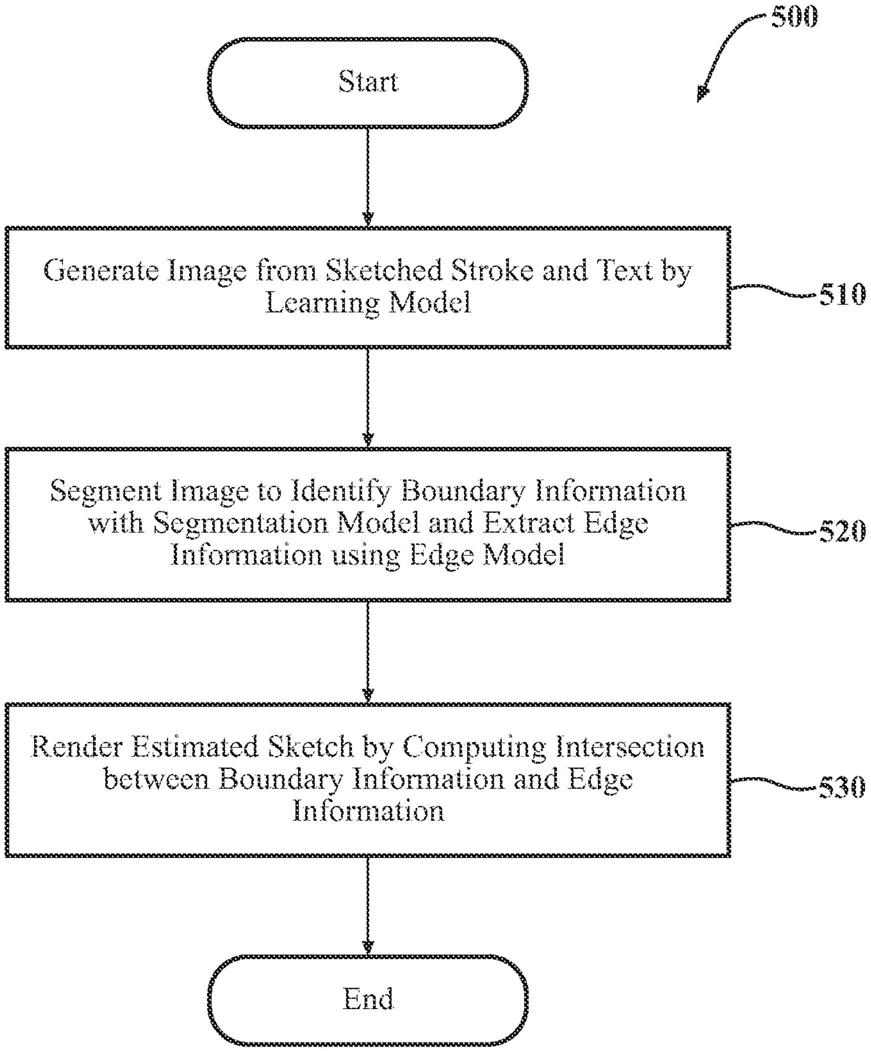
FIG. 5 illustrates one embodiment of a method that is associated with identifying boundary and edge information about the image for rendering the estimated sketch using models.

Additional aspects of the drawing system 100 will be discussed in relation to FIG. 5. FIG. 5 illustrates a flowchart of a method 500 that is associated with generating drawings iteratively using models guided by sketches and text for a design. Method 500 will be discussed from the perspective of the drawing system 100 of FIG. 1. While method 500 is discussed in combination with the drawing system 100, it should be appreciated that the method 500 is not limited to being implemented within the drawing system 100 but is instead one example of a system that may implement the method 500.

At 510, the drawing system 100 generates an image from a sketched stroke and text by a learning model. Here, the drawing system 100 can include a model sketch-to-design that converts a sketched stroke and text inputted about a design concept and generates product designs. For example, a designer inputs a product (e.g., a bumper) and a design concept that is abstract (e.g., hidden) as the text along with the sketched stroke. In one approach, the sketch-to-design includes a LLM that processes the text to generate analogical inspirations and ideas for the design concept. In particular, the text can prompt the LLM to detail design principles for a product including context for generating well-thought-out inspirations. The drawing system 100 can prompt the LLM to generate inspirations from diverse domains (e.g., nature, architecture, fashion, etc.) using the design principles.

Moreover, the LLM ideates inspirations for the product and concept. The design ideas are further enhanced through iterations until a designer selects a design idea that is recommended. Furthermore, a ML model (e.g., a controlnet) within the sketch-to-design receives the sketched stroke (e.g., a single line) and the design idea as text from a prompt and renders a generative image. In one approach, as explained more below, the drawing system 100 continues guiding the design idea using additional strokes inputted and modifying sketches estimated with a model design-to-sketch. The iterative process involves generating a new design with the additional strokes and modifying estimated sketches. In this way, the drawing system 100 fosters and develops design through sketching rather than mainly text prompts, thereby expanding creativity and accelerating design development.

At 520, the drawing system 100 segments the image to identify the boundary information 160 with a segmentation model and extracts the edge information 150 using an edge model. Here, the design-to-sketch includes another model for image segmentation (e.g., a data-driven model) that executes semantic, instance, etc. segmentation on the image from the sketch-to-design. The drawing system 100 can identify the boundary information 160 from a segmentation map outputted by the segmentation model and form a skeleton drawing. As previously explained, the segmentation map of the generative image can include natural borders that are separated using defined parts. For example, the defined parts are identified according to estimated classifications by the segmentation model for areas within the image.

Regarding extracting the edge information, the edge model can detect soft and other edges from the image generated with the sketch-to-design. As previously explained, a soft edge can include structural lines having varying thicknesses, opacities, and transparency rather than common and minor edges associated with the image. In one approach, the edge model is a HED model that detects hard edges, soft edges, etc. from an inputted image using hierarchical representations within a NN.

At 530, the design module 130 renders an estimated sketch by computing an intersection between the boundary information 160 and edge information 150. As previously explained, the intersection operation can allow the design module 130 to locate major lines and natural borders of the image. In this way, the operation eliminates redundant lines and certain texture, thereby increasing the clarity and definition of sketches. The intersection can be areas within the image that are segmented and exhibit similar visual data. In one approach, the intersection operation removes texture and redundant patterns by functioning as "AND" computational logic for areas within the image having a major silhouette and edges. As such, the drawing system 100 allows varying thicknesses and line opacity through processing the edge information 150 and the boundary information 160 derived with image segmentation that creates defined aesthetics to a sketch. Accordingly, the drawing system 100 improves ideation for designs through sketching and text guidance, thereby reducing design times and increasing designer satisfaction.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk$^{M}$, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A drawing system comprising:

a memory storing instructions that, when executed by a processor, cause the processor to:

generate an image from a sketched stroke and text inputted to a learning model, and remix the text to generate forms of the image from randomized seeds associated with design parameters;

segment the image to identify boundary information with a segmentation model and extract edge information from the image using an edge model;

render an estimated sketch of the image by computing an intersection between the boundary information and the edge information; and remove texture and redundant lines for locating natural borders associated with the boundary information and the intersection, wherein the intersection has areas within the image having visual data that are similar.

2. The drawing system of claim 1, wherein the instructions to segment the image further include instructions to:

estimate a segmentation map by the segmentation model; and draw the natural borders for colored parts defined by the segmentation map to derive the boundary information.

3. The drawing system of claim 2, wherein the instructions to render the estimated sketch further include instructions to:

remove the texture and the redundant lines for the natural borders.

4. The drawing system of claim 2, wherein the natural borders separate the colored parts according to classifications identified by the segmentation map.

5. The drawing system of claim 2, wherein the edge information includes soft edges about the image, wherein the soft edges include structural lines having varying thicknesses, opacities, and transparency levels.

6. The drawing system of claim 1 further including instructions to:

underlay the estimated sketch within a canvas on an interface;

modify the estimated sketch within the interface; and receive by the learning model the estimated sketch as a feedback input.

7. The drawing system of claim 1, wherein the design parameters are associated with one of a body line, an exterior contour, scenery information, a product type, a product feel, and a product perception.

8. The drawing system of claim 1, wherein the instructions to generate the image from the sketched stroke further include instructions to:

process the text by a large language model (LLM) of the learning model to output design ideas, wherein the text includes a product category and a design concept associated with the design ideas; and form the image by a control network (controlnet) of the learning model according to the design ideas and the sketched stroke.

9. A non-transitory computer-readable medium comprising: instructions that when executed by a processor cause the processor to:

generate an image from a sketched stroke and text inputted to a learning model, and remix the text to generate forms of the image from randomized seeds associated with design parameters;

segment the image to identify boundary information with a segmentation model and extract edge information from the image using an edge model;

render an estimated sketch of the image by computing an intersection between the boundary information and the edge information; and remove texture and redundant lines for locating natural borders associated with the boundary information and the intersection, wherein the intersection has areas within the image having visual data that are similar.

10. The non-transitory computer-readable medium of claim 9, wherein the instructions to segment the image further include instructions to:

estimate a segmentation map by the segmentation model; and draw the natural borders for colored parts defined by the segmentation map to derive the boundary information.

11. The non-transitory computer-readable medium of claim 10, wherein the instructions to render the estimated sketch further include instructions to:

remove the texture and the redundant lines for the natural borders.

12. The non-transitory computer-readable medium of claim 10, wherein the natural borders separate the colored parts according to classifications identified by the segmentation map.

13. A method comprising:

generating an image from a sketched stroke and text inputted to a learning model, and remixing the text to generate forms of the image from randomized seeds associated with design parameters;

segmenting the image to identify boundary information with a segmentation model and extracting edge information from the image using an edge model;

rendering an estimated sketch of the image by computing an intersection between the boundary information and the edge information; and removing texture and redundant lines for locating natural borders associated with the boundary information and the intersection, wherein the intersection has areas within the image having visual data that are similar.

14. The method of claim 13, wherein segmenting the image further includes:

estimating a segmentation map by the segmentation model; and drawing the natural borders for colored parts defined by the segmentation map to derive the boundary information.

15. The method of claim 14, wherein rendering the estimated sketch further includes:

removing the texture and the redundant lines for the natural borders.

16. The method of claim 14, wherein the natural borders separate the colored parts according to classifications identified by the segmentation map.

17. The method of claim 14, wherein the edge information includes soft edges about the image, wherein the soft edges include structural lines having varying thicknesses, opacities, and transparency levels.

18. The method of claim 13 further comprising:

underlaying the estimated sketch within a canvas on an interface;

modifying the estimated sketch within the interface; and receiving by the learning model the estimated sketch as a feedback input.

19. The method of claim 13, wherein the design parameters are associated with one of a body line, an exterior contour, scenery information, a product type, a product feel, and a product perception.

20. The method of claim 13, wherein generating the image from the sketched stroke further includes:

processing the text by a large language model (LLM) of the learning model to output design ideas, wherein the text includes a product category and a design concept associated with the design ideas; and forming the image by a control network (controlnet) of the learning model according to the design ideas and the sketched stroke.

* * * * *